Nov. 13, 1951     H. A. COURMETTES     2,574,960

CATARACT BIFOCAL LENS

Filed Oct. 14, 1946

*INVENTOR.*

Henry A. Courmettes

Patented Nov. 13, 1951

2,574,960

UNITED STATES PATENT OFFICE 2,574,960

CATARACT BIFOCAL LENS

Henry A. Courmettes, Coconut Grove, Fla.

Application October 14, 1946, Serial No. 703,192

2 Claims. (Cl. 88—54)

The objects of the invention are to produce an ophthalmic cataract bifocal lens having the following features: means to obtain the individual inclination for each and both of its visual areas as desired to improve their disposition to their respective line of vision, and means whereby separate control of the degree of light transmission for each of its visual areas may be included.

I obtain these objects, first, with a new one-piece segment lens of the thin edge convex type but of double lenticular form disposed one above the other and in which its inner side has two differently curved surfaces strongly inclined to each other whereby, in combination with its uniformly finished convex outer side, a different plane of inclination and desired location of optical center are created for each of its two lenticular portions; second, with a main supporting lens of the biplanar form upon which the said segment lens is secured and covers a part coextensive with its double lenticular form, the adjoining sides of both lenses corresponding in surface fitting form; where light control is desired, the said main supporting biplanar lens is made up of two glass sections, an upper and a lower, having different specific light transmitting powers and/or colors and fused edge to edge in a suitable line and upon which the segment lens is then secured to so that its upper lenticular portion extends over the upper and its lower portion extends over the lower glass section of the said main supporting lens, thus, the segment lens may be of colorless glass and the finished lens be differently treated for light transmission in its visual areas independently of each other.

The angularly disposed inner surfaces of the segment lens, together with its single convex outer surface, bringing about the desirable forms for the visual portions of a cataract lens and at the same time reducing its weight in the proportion of power and sizes of the visual areas. Thus, the one-piece segment lens creates the two visual areas in the finished lens and completes the total dioptric lens powers.

By this method a cataract ophthalmic lens may be made in which its visual areas present a front substantially normal to their respective visual axes thereby avoiding distortion caused by obliquity of the line of sight relative to and through such strong convex corrective lens, a desired factor involving the quality of sight in aphakia. The method further makes possible the placing of optical centers in the parts of the visual areas mostly suitable so that the wearer may have direct vision in line with objects viewed without interference of prism and chromatic aberrations, and by a slight turn of the lens upon itself give the true pupilary distance for reading.

The two component lenses may be secured together by any method known to the art.

More specifically, references are made to the drawings which form a part of this invention in which similar characters refer to similar parts throughout and in which.

Figure 1:
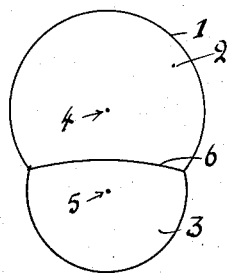
Fig. 1 is a front face view of the one-piece segment lens component showing its double lenticular form.
Figures 2, 3:
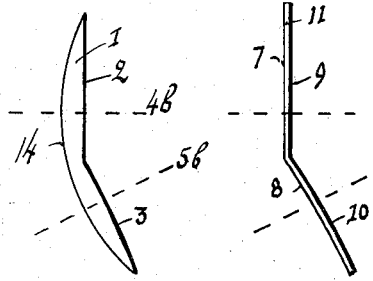
Fig. 2 is a sectional perpendicular side view of Fig. 1.
Fig. 3 is a sectional perpendicular side view of the main supporting biplanar lens component.
Figure 4:
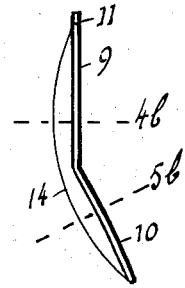
Fig. 4 is a sectional side view of the two lens components joined to form a finished lens.
Figure 5:
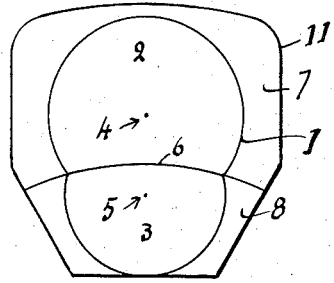
Fig. 5 is a front face view of a complete finished lens showing both lens components.
Figure 6:
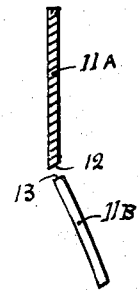
Fig. 6 is a sectional side view of two glass sections which have different specific light transmitting powers before welding to form a solid biplanar lens component.
Figure 7:
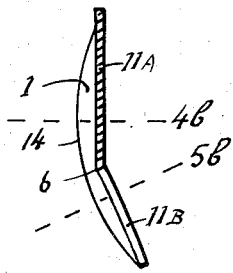
Fig. 7 is a sectional side view of a finished lens the main supporting component of which is made of two glass sections fused together to form a solid lens, and a one-piece bifocal segment lens of double lenticular form secured thereto, the line of fusing demarcation in the said main supporting component substantially corresponding with the line of bifocal demarcation in the said segment lens.

From the drawings, Figs. 1 and 2, the one-piece segment lens I is of the thin edge convex lenticular type and is formed, with respect to its inner side, to include two surfaces 2 and 3 which have different curvatures and are set at a calculated angle 4b and 5b to each other and shaped to form, in combination with the single convex surface of its outer side 14, two lenticular portions meeting at the line of demarcation 6 of the said two surfaces 2 and 3; both sides of the said segment lens combining to form two visual areas 2 and 3, an upper and a lower, cause their optical centers 4 and 5 to be within their respective location, and determine the total angular setting of the said two visual areas. The segment lens I is secured to the main supporting lens II Figs. 3—4—5, this supporting lens component of the finished lens is of a biplanar form Fig. 3 and the segment lens I secured to its outer surfaces 7 and 8, the said supporting lens does not need to be of no dioptric power but, in combination with the segment lens 1, be included in the total dioptric powers of the finished lens. Further, when needed, the said main supporting lens 11 may be composed of two glass sections 11a and 11b shaded differently for light transmission as in Fig. 6 where the components are then fused in a line joining their edges 12 and 13 corresponding with line 6 dividing the two visual areas 2 and 3 and provide a different but substantially uniform shading in each of the said two areas in the finished lens.

In the selection of glass material, obviously, I bear in mind that the more nearly the two glass sections 11a and 11b are of the same index of refraction, the more nearly light reflects from their fused edge surfaces at demarcation 6 are prevented.

The reference to color or shade of glass used herein is understood to include white glass (colorless), smoke, etc. in any shade or tint and, likewise, light transmission power applies to glasses of various colors, shades, tints, white (colorless), smoke, etc.

While glass has been the material referred to herein, plastics, crystals, color flashing, or other materials suitable in the making of my lens, are conceived and their uses included in the invention.

Having thus explained and described my ophthalmic cataract lens and method for making the same, I claim:

1. A cataract ophthalmic bifocal embodying the combination of two lenses; one, a biplanar main supporting lens constructed of two glass sections having different specific light transmission powers and joined together in an angular position substantially corresponding to the desired relative tilting of their respective visual parts in the finished lens, the inner surface curvatures of said biplanar main supporting lens being different to the extent of the additional power required for near vision over that of the distant vision correction; the second, a one-piece segment lens of the thin edge convex power type secured upon the outer side of the said supporting lens and covering a part of both of its sections thereby creating two visual areas corresponding in shape to that of the individual part of the one-piece segment lens extending over each of the said sections and, thus combined, provide the total dioptric powers for both visual areas in the finished lens; further, said segment lens being formed, with respect to one of its sides, to correspond to the form of the side of the biplanar lens upon which it is secured.

2. A cataract ophthalmic bifocal embodying two integral lenses; one, a biplanar main supporting lens having an upper and a lower section angularly disposed in relation to each other and substantially corresponding to the desired tilting of their respective visual parts in the finished lens, the inner surface curvatures of said biplanar main supporting lens being different to the extent of the additional power required for near vision over that of the distant vision correction; the second, a one-piece segment lens of the thin edge convex power type secured upon the outer side of the said supporting lens and covering a part of both of its sections thereby creating two visual areas corresponding in shape to that of the individual part of the one-piece segment lens extending over each of the said sections and, thus combined, provide the total dioptric powers for both visual areas in the finished lens; further, said segment lens being formed, with respect to one of its sides, to correspond to the form of the side of the biplanar lens upon which it is secured.

HENRY A. COURMETTES.

REFERENCES CITED

The following references are of record in the file of this patent:

UNITED STATES PATENTS

| Number | Name | Date |
| --- | --- | --- |
| 1,445,063 | Arntz | Feb. 13, 1923 |
| 1,771,457 | Suzuki et al. | July 29, 1930 |
| 1,865,715 | Tillyer | July 5, 1932 |
| 1,950,925 | Jones | Mar. 13, 1934 |
| 1,991,544 | Courmettes | Feb. 19, 1935 |
| 2,057,179 | Bausch | Oct. 13, 1936 |

FOREIGN PATENTS

| Number | Country | Date |
| --- | --- | --- |
| 113,191 | Great Britain | Feb. 14, 1918 |
| 176,680 | Switzerland | July 1, 1935 |
| 788,203 | France | July 22, 1935 |
| 846,221 | France | June 5, 1939 |